A. E. WALLER.
FLYING CHUCK.
APPLICATION FILED FEB. 24, 1919. RENEWED FEB. 13, 1922.
1,420,794.
Patented June 27, 1922.
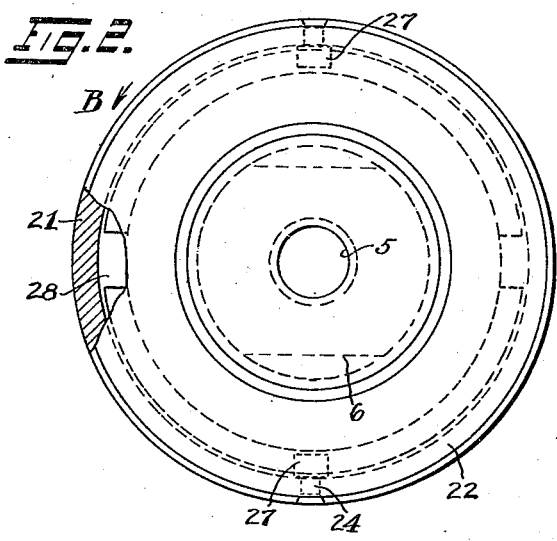
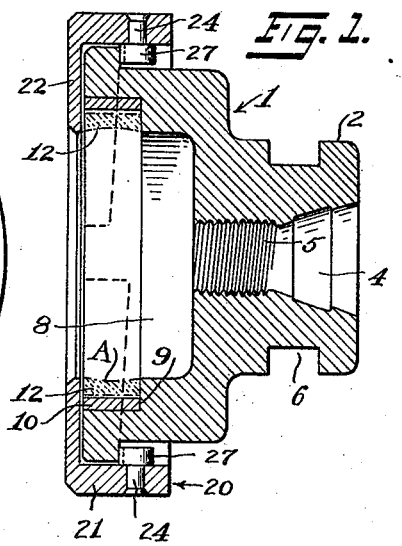
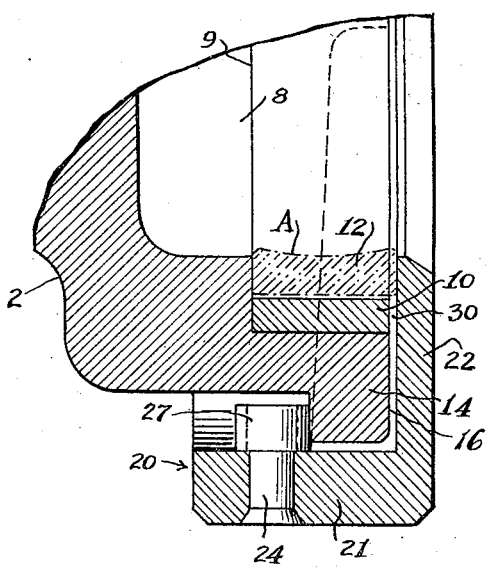
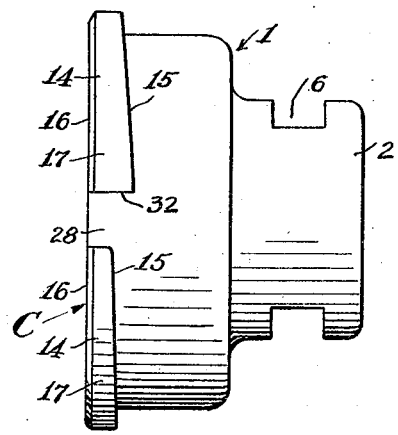
Inventor;
Algot Emanuel Waller;
By his Atty,
Chas. Lyon Russell

UNITED STATES PATENT OFFICE.

ALGOT EMANUEL WALLER, OF WEST HARTFORD, CONNECTICUT, ASSIGNOR TO THE SKAYEF BALL BEARING COMPANY, OF HARTFORD, CONNECTICUT, A CORPORATION OF CONNECTICUT.

FLYING CHUCK.

1,420,794. Specification of Letters Patent. Patented June 27, 1922.

Application filed February 24, 1919, Serial No. 278,831. Renewed February 13, 1922. Serial No. 536,340.

*To all whom it may concern:*

Be it known that I, ALGOT EMANUEL WALLER, a subject of the King of Sweden, residing in West Hartford, in the county of Hartford and State of Connecticut, U. S. A., have invented certain new and useful Improvements in Flying Chucks, of which the following is a specification.

My present invention relates to a modified form of flying chuck such as is used in gripping articles for machining, as in the manufacture of parts in quantity lots, and contemplates a structure wherein the device is reduced to two simple elements, namely, a chuck body and a flying friction locking member, whereby through the action of inertia of the parts, the article to be chucked may be automatically held in operative position for machining, or automatically released, leaving the chuck open to permit removal of the article being machined and to receive another part to be chucked and machined.

Referring to the drawings,—

Figure 1 is an axial sectional view of my device;

Fig. 2 is a face or front view of my device partly in section;

Fig. 3 is an enlarged fragmental sectional view showing certain details; and

Fig. 4 is a side elevation of the body member.

The chuck body 1 may comprise a single piece of metal, such as steel, which may be accurately machined and hardened thereby to better withstand the wear without undue loss of accuracy. The rear or hub portion thereof 2 is provided with a tapering bore 4, having a threaded extension 5 thereby to enable the chuck to be rapidly and accurately attached to the driving spindle of any suitable machine, such as a speed lathe, (not shown). As this particular method of attachment of chucks is well-known, it is not further referred to herein.

The hub portion 2 is provided with milled slots forming spanner wrench seats 6 to permit the chuck to be firmly screwed onto said driving spindle by means of a spanner or other suitable type of wrench.

The chuck body is further provided with a hollowed-out front portion generally denoted by 8, there being formed in such front portion a working or chuck seat having a rear stop or wall 9, and in which seat there is preferably located an operative positioning seat, in which is positioned the work piece to be machined. In the illustration there is shown driven into the seat 8 a carefully ground and fitted bushing 10.

In my present embodiment I have shown my chuck adapted to be utilized for chucking a ball race ring 12, for grinding the interior thereof, and such a ring is indicated in dotted section (Figs. 1 and 3).

Upon the outer cylindrical surface of the chuck body there is located, near its front working face or edge, a pair of segmental cam lugs 14, and while these lugs may be made removable or adjustable to suit various conditions, preferably they are made integral with the chuck body 1. These lugs 14 are helical as to their back faces 15, only, the front faces 16 and the peripheral faces 17 thereof being substantially flat and cylindrical respectively. The helical back faces 15 partake of an angle of about 5 degrees to the front face 16 of the chuck body.

The flying friction locking or chucking ring 20 comprises a cylindrical side wall or portion 21 having an integral annular jaw portion 22. This ring 20 is preferably made of steel, hardened and ground to insure accuracy, and is provided at diametrically opposite locations with a pair of cam pins 24 riveted or otherwise rigidly affixed to the cylindrical portion 21, and projecting inwardly toward the chuck body. Said pins have rotatably mounted thereon a pair of friction-reducing rolls 27 adapted to engage the helical cam faces 15 on the chuck body 1.

It will be noted that the two lugs 14 are symmetrically arranged and that they are spaced apart at their adjacent ends to form re-entrant and exit passages 28 for the rolls 27, so that when it is desired to remove the chucking ring 20, a twist of the same toward the recessional end C of the helical members 14 will bring the rolls 27 to the passages 28 whereby the ring may be freely removed, or replaced by reverse action. It will thus be seen that the locking action of the chucking ring 20 might be termed a bayonet-lock action.

It will be noted that a clearance 30 (Fig. 3) is left between the inner face of the face portion 22 and the housing front faces 16, such clearance being necessary when an article is being held in operative position in the chuck in order to insure that the article is held, or chucked, by and between the inner face portion 22 of the flying clutch ring 20 and the stop wall 9 of the body 1.

In the operation of chucking an annular member, such as the race ring 12, it will be understood that when the friction locking member 20 is bayonet-locked into position as shown in Figs. 1 and 3, the race ring 12 is of such a width as to project slightly beyond the front face 16 so that the full compression force of the chucking ring 20, when bayonet-locked into position, will be exerted to frictionally hold such piece 12 between the seat 9 of the chuck body 1 and the inner face of the annular face member 22.

The lead angle of the helical faces 15, is such that it is impossible to jam the friction ring 20 on the chuck by reason of the gripping action of the rolls 27; in fact, the angle of lead is only so acute, in relation to the rotary locking motion as to no more than grip and hold the ring 20 in proper operative position by the inertia of the said ring during the rotation of the entire chuck.

Assuming that the chuck has been mounted upon a driving machine spindle revolving at a high grinding speed, say about seven thousand revolutions per minute in an anti-clockwise direction, or in the direction of the arrow B, shown at Fig. 2, and that a race ring 12 to be ground internally at the surface A has been placed in the chuck in the position shown in Figs. 1 and 4, and the ring 20 brought up to the operative locking position. Obviously under these conditions, the chucking ring 20, which is being held to the chuck body 2 by the two anti-friction rolls 27, is being rotatably driven by the rotary action of the chuck body 2, and that therefore the inertia or resistance of the chucking ring 20 tends to rotate it backwardly, and through the engagement of the rolls 27 with the helical faces 15 thereby causing the ring to be drawn inwardly and tending to decrease the clearance 30. This action is resisted by the work piece 12, which projects beyond the face 16, as previously explained, and therefore the work piece 12 is forced against the seat 9 and this force grips the work piece 12 so strongly as to prevent it from turning under the ordinary stress of the machining operation.

When the grinding or other operation is completed, and it is desired to remove the work piece 12, it is simply necessary to stop the high speed rotating spindle, abruptly if desired, or by simply shutting off the power, and the momentum stored in the flying chucking ring 20 causes it to rotate in advance of the retarded chuck body 2, in the direction of the arrow B, thereby unlocking the ring until the rolls 27 strike the rear terminal faces 32 (Fig. 4) of the segments 14, when the ring 20 will fall outwardly into the hand of the operator held in a receptive position adjacent to the chuck, thereby leaving the chuck body 2 free from all incumbrances and ready for the removal of the work piece 12 which is simply withdrawn by hand.

For the introduction of another work piece 12, the piece is introduced by hand into the chuck, and the chucking ring 20, having its anti-friction rolls 27 introduced at the re-entrant passages 28, is then simply pressed forwardly until it bears upon the work piece 12, whereupon the spindle is started at once under power and at speed, thereby driving the chuck body forward and causing the helical faces 15 to engage the rolls 27, while the chucking ring 20 is being held by the operator in engaging position. At the instant of engagement of the chucking ring 20 with the work piece 12, the ring naturally slips from the operator's grasp and the inertia of the chucking ring 20, as previously explained, frictionally holds the work piece 12 in position for the machining operation.

It is obvious from a consideration of the foregoing, that the operator does not necessarily manually lock or unlock the chucking ring 20, but that the rotative forces caused by the inertia of the ring during starting and stopping are the sole actuating forces for causing it to automatically lock or automatically unlock for holding or releasing the work piece being machined.

It is further obvious that a comparatively heavy chucking ring 20 may be used and that the angle of the helical face 15 must be in accordance with the speed of rotation of the chuck; and that with the proper proportioning of these three factors, the chuck will operate very efficiently and satisfactorily.

Also, there is great economy in the manufacture of the chuck itself, owing to the small number of parts used in its construction, the simple form and function of these parts, and the ease of repair of such parts as are subject to wear.

Obviously many changes may be made in the various features of arrangement and structure without departing from the scope of the invention as claimed.

I claim:

1. In an apparatus of the character described, the combination with a chuck body having an opening in its front end surrounded by an annular seat and an annular front face, lugs disposed on the sides of the body and provided at the rear with cam faces forming acute angles with the said front face, a chucking ring comprising a side wall and an annular face portion, inwardly overhanging the said front face, and a pair of diametrically oppositely disposed engaging members on the said side wall and adapted to engage said cam faces, the chucking ring and cam faces being so organized that the inertia of said ring tends to lock the chuck and the momentum thereof to unlock the same.

2. A flying chuck of the class described, comprising a body having a pair of rearwardly directed cams and at its forward portion a work seat, of a clamping ring having a portion to overhang the work seat and a rearwardly directed portion having cam engaging means, there being suitable passageways provided between the cams for permitting the passage therethrough of the cam engaging means for permitting the application and removal of the clamping member.

ALGOT EMANUEL WALLER.

Witnesses:
EMIL OHSSTROM,
A. B. MECKE.